(12) United States Patent
Imamura et al.

(10) Patent No.: US 8,214,527 B2
(45) Date of Patent: Jul. 3, 2012

(54) FAST ALGORITHM FOR PEER-TO-PEER SHORTEST PATH PROBLEM

(75) Inventors: Tomokazu Imamura, Yawata (JP); Hiroki Yanagisawa, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 716 days.

(21) Appl. No.: 11/963,826

(22) Filed: Dec. 22, 2007

(65) Prior Publication Data

US 2008/0155119 A1 Jun. 26, 2008

(30) Foreign Application Priority Data

Dec. 22, 2006 (JP) ................................. 2006-345224

(51) Int. Cl.
*G06F 15/173* (2006.01)

(52) U.S. Cl. ........................................ 709/241; 709/238

(58) Field of Classification Search .................. 709/241, 709/238

See application file for complete search history.

(56) References Cited

U.S. PATENT DOCUMENTS

| | | | |
|---|---|---|---|
| 4,823,111 A * | 4/1989 | Tsuchiya et al. .............. | 370/408 |
| 6,098,107 A * | 8/2000 | Narvaez-Guarnieri et al. ............................. | 709/239 |
| 2006/0112098 A1 * | 5/2006 | Renshaw et al. .................. | 707/7 |
| 2007/0156330 A1 * | 7/2007 | Goldberg et al. ............. | 701/202 |

FOREIGN PATENT DOCUMENTS

JP 2006-201174 8/2006

* cited by examiner

*Primary Examiner* — Ashok Patel
*Assistant Examiner* — Lawrence Cosby
(74) *Attorney, Agent, or Firm* — Ido Tuchman; William J. Stock

(57) ABSTRACT

A plurality of landmarks selected from a source weighed graph on which a path search is performed; and the shortest path lengths between landmarks, and the shortest path lengths from vertices to landmarks adjacent to the respective vertices are calculated, and are stored in a memory device so as to be later referable. Routines for calculating upper and lower limits of the shortest path length corresponding to two vertices v and w are prepared by using expressions derived from quadrangle inequalities formed of the two vertices v and w as well as two landmarks adjacent to the respective vertices v and w. In response to a call from an A* search program, these routines return the upper limit or the lower limit of the shortest path length corresponding to v and w by referring to the shortest path lengths between landmarks, and the shortest path lengths from vertices to landmarks adjacent to the respective vertices, which have been previously stored in the memory device.

21 Claims, 8 Drawing Sheets

FAST ALGORITHM FOR PEER-TO-PEER SHORTEST PATH PROBLEM

CROSS-REFERENCE TO RELATED APPLICATIONS

This application claims priority under 35 U.S.C. §119 to Japanese Patent Application No. 2006-345224 filed Dec. 22, 2006, the entire text of which is specifically incorporated by reference herein.

BACKGROUND OF THE INVENTION

1. Field of the Invention

The present invention relates to a path-search technology. More specifically, the present invention relates to a method of, a program for, and a system for speeding up a path search.

2. Description of the Related Art

In recent years, as the number of optimum traffic route-search services in car navigation systems and websites has increased, there has been a growing demand for a speeded-up technique for finding a route by use of a computer. In terms of computer science, this comes down to an algorithm of determining the shortest path in a weighted graph.

Incidentally, as a classic technique for an algorithm of determining the shortest path in a weighted graph, there has been known a technique called Dijkstra method. In essence, when the shortest path from a vertex a to a vertex z is determined in a graph G with this method, the shortest path from the vertex a to a certain one of vertices is firstly determined; then the shortest paths from the vertex a to all the vertices excluding the certain vertex whose shortest path has been determined are sequentially determined; and the processing is terminated when the shortest paths to the all the vertices are determined. This algorithm is guaranteed to always have a solution, but becomes unrealistic in terms of calculation amount when the number of vertices in the graph G is increased.

To solve this, various techniques improved in terms of calculation amount have been proposed. As one of those techniques, there is a technique called A* search. This technique is configured to speed up a calculation for the shortest path by using previously calculated upper and lower limits of the shortest path length between 2 vertices, and is specifically a technique as described below.

In the following description, given vertices v and w, assume that d(v,w) denotes the shortest path length from the vertex v to the vertex w, and that w(v,w) denotes the length of an edge connecting the vertices v and w to each other.

Firstly, in order to find the shortest path from a starting point s to a terminal t, the following conditions are defined as initial settings for each of the vertices v:

π(v): lower limit of d(v,t);
k(v): k(s) := π(s) where v = s, and k(v) := ∞ where v ≠ s;
d(v): d(s) := 0 where v = s, and d(v) := ∞ where v ≠ s;
prev(v) = NULL; and
vertex set S = {s}.

On this premise, search processing is performed in the following manner:

```
while (S is not empty) {
    from S, remove vertex v giving smallest value of k(v)
    for (perform following operations on all of
edges(v,w) extending from v) {
        if (k(w) > k(v) + w(v,w) − π(v) + π(w)) {
            k(w) := k(v) + w(v,w) − π(v) + π(w);
            d(w) := d(v) + w(v,w);
            prev(w) := v;
            if (d(w) + π(w) <= min(upper limit of
d(s,t), d(t)))
                {S ← S∪{w};}
        }
    }
}
```

A value finally assigned to d(t) is the shortest path length.

Additionally, assuming that t', t" . . . , denote vertices assigned to prev(t), prev(t'), . . . , respectively, "t←t'←t"← . . . ←s" is the shortest path.

It has been known that, when the upper and lower limits of d(v,w) are correctly given for any two vertices v and w, the abovementioned A* search correctly finds the shortest path. Additionally, it has been known that the higher an accuracy of the upper limit given to the A* search is, the faster the terminal can be reached. By intuition, a lower limit of the shortest path length of a path from the starting point s to the terminal t by way of the vertex v is stored in k(v) in this algorithm, and the shortest path length from the starting point s to the vertex v is stored in d(v).

Here, a part (a method of calculating the upper and lower limits of d(v,w)), which is a black box in the abovementioned A* search algorithm, has conventionally been a problem.

In connection with this problem, first of all, there is a technique described in "Computing the Shortest Path: A* Search Meets Graph Theory" by A. V. Goldberg and C. Harrelson (in Proceedings of 16th Annual ACM-SIAM Symposium on Discrete Algorithms (SODA '05), Vancouver, Canada, 2005).

In this technique, a small number of (ten and several) vertices on a graph are selected as "landmarks," and the shortest path lengths from the landmarks to each of vertices are stored. Then, a lower limit of the shortest path length between any two vertices is computed by using the stored shortest path lengths. Thus, this technique achieves a speed-up of search with A* search.

Additionally, also known is "Goal Directed The shortest path Queries Using Precomputed Cluster Distances" by Jens Maue, Peter Sanders, Domagoj Matijevic (in Proceedings of the 5th International Workshop on Experimental Algorithms (WEA-06), LNCS 4007, 316-327, Springer, 2006).

In this technique, a graph is divided into a large number of clusters, and the shortest path lengths between the respective clusters are defined and stored. Then, upper and lower limits of the shortest path length between any two vertices are then computed by using the stored shortest path lengths. Thus, this technique achieves a speed-up of search with A* search by combining pruning based on the upper limit of the shortest path length with the A* search.

In both of these techniques, accuracies of "upper and lower limits of the shortest path length between any two vertices" which are used in the A* search greatly contribute to the speed-up of the algorithm. The technique described in "Computing the Shortest Path: A* Search Meets Graph Theory" by A. V. Goldberg and C. Harrelson (in Proceedings of 16th Annual ACM-SIAM Symposium on Discrete Algorithms (SODA '05), Vancouver, Canada, 2005) (hereinafter referred to as "Goldberg") has a shortcoming that, while information on a plurality of landmarks is used when the lower limit is calculated, the number of the landmarks themselves is small. The technique described in "Goal Directed Shortest Path Queries Using Precomputed Cluster Distances" by Jens Maue, Peter Sanders, Domagoj Matijevic (in Proceedings of the 5th International Workshop on Experimental Algorithms (WEA-06), LNCS 4007, 316-327, Springer, 2006) (hereinafter referred to as "Maue") has a shortcoming that, while the number of the clusters themselves is large, the number of information on the clusters used when the lower limit is calculated is small.

Among other conventional techniques, there is a technique disclosed in Japanese Patent Application Laid-open Publication No. 2006-201174. However, one of the inventors thereof is also listed as one of the authors of the abovementioned Goldberg, and the contents of the disclosure are roughly the same as those of the above-mentioned Goldberg.

BRIEF SUMMARY OF THE INVENTION

To cope with these problems, an object of the present invention is to provide a technique used for speeding up a path search.

More specifically, another object of the present invention is to speed up a path search using A* search by enhancing accuracies of upper and lower limits of the shortest path length between any two vertices.

As a result of accumulated researches, the present inventors have reached an idea that a path search can be speeded up by a method as described below.

In other words, first of all, landmarks are generated for a source weighed graph on which a path search is performed, and information necessary for calculating upper and lower limits is calculated in advance.

Next, upper and lower limits of the shortest path length are calculated. In the present invention, a particular focus is put on a quadrangle inequality composed of four points which are a vertex v, a landmark Lv adjacent to the vertex v, a vertex w, and a landmark Lw adjacent to the vertex w, and the following inequalities are used in calculating the upper and lower limits: the lower limit of $d(v,w)$: $d(v,w) >= d(Lv,Lw) - d(Lv,v) - d(w, Lw)$, and the upper limit of $d(v,w)$: $d(v,w) <= d(v, Lv) + d(Lv, Lw) + d(Lw,w)$.

It should be noted that all of values of the right-hand sides of these inequalities are calculated and stored in advance in association with the generation of the abovementioned landmarks.

These calculation routines for the upper and lower limits are called up as appropriate to be used in A* search performed later.

According to the present invention, enhancement of accuracies of upper and lower limits of the shortest path length is achieved, and a time taken for a path search is shortened as a result. According to an experiment by the inventors, it was confirmed that, in terms of a search on a particular graph, a search performance was enhanced to four times as high as that of the technique described in the abovementioned Maue.

BRIEF DESCRIPTION OF THE SEVERAL VIEWS OF THE DRAWINGS

For a more complete understanding of the present invention and the advantage thereof, reference is now made to the following description taken in conjunction with the accompanying drawing.

DETAILED DESCRIPTION OF THE INVENTION

Figure 1:
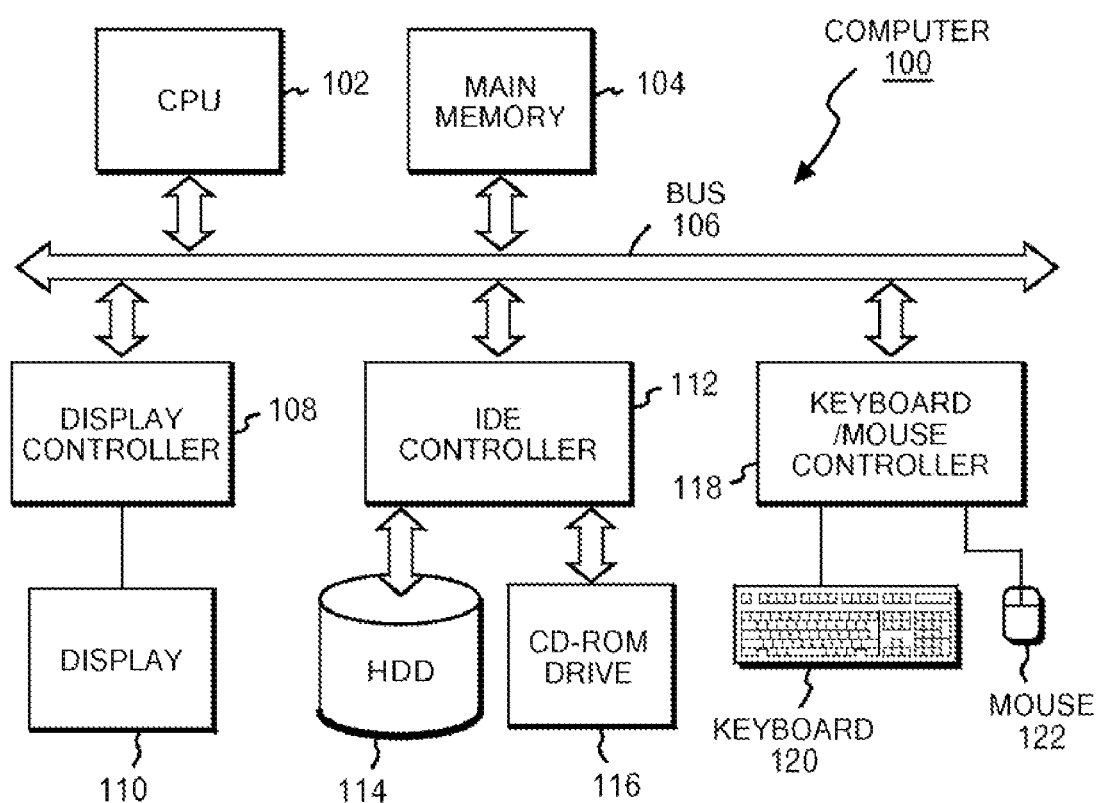
FIG. 1 is a block diagram of hardware used for implementing the present invention.

An embodiment example of the present invention will be described below based on the drawings. Unless otherwise stated, the same reference numerals refer to the same subjects throughout all of the drawings. Note that described below is one embodiment of the present invention, and that there is no intention to limit the present invention to the contents described in connection with this embodiment example.

FIG. 1 is a block diagram of a hardware configuration used for executing a method of the present invention. In FIG. 1, a computer 100 includes a CPU 102 and a main memory 104, and these are connected to a bus 106. The main memory 104 is one having a storage capacity of at least 512 MB, and suitably not less than 1 GB. In order to load, onto the main memory, data (all-vertices data) on all of vertices in a later described graph, the larger the capacity of the main memory 104 is, the more preferable. The CPU is, suitably, one based on an architecture of 32 bits or 64 bits, and, for example, Pentium (R) 4 of Intel Corporation, Athlon (R) of AMD Inc. or the like can be used for the CPU. To the bus 106, a display 110 formed of an LCD monitor or the like is connected via a display controller 108. The display 110 is used for viewing a program, and for editing the program, the program having been written for processing according to the present invention. The display 110 is used for displaying a path having been searched for in accordance with the present invention. To the bus 106, a hard disk 114 and a CD-ROM drive 116 are connected via an IDE controller 112. In the hard disk 114, an operating system, a complier and other programs are stored in a form loadable onto the main memory 104. The hard disk 114 is one having a storage capacity of at least 40 GB, and suitably not less than 160 GB. The CD-ROM drive 116 is used for additionally installing a program from a CD-ROM into the hard disk 114 according to need. To the bus 106, furthermore, a keyboard 120 and a mouse 122 are connected via a keyboard/mouse controller 118. The keyboard 120 and the mouse 122 are used for writing a program caused to execute processing according to the present invention, and are used for executing the program.

A software environment of the computer 100 will be further described. As the abovementioned operating system, any one of Linux (R), Windows XP (R) and Windows (R) 2000 of Microsoft Corporation, Mac OS (R) of Apple Computer Inc., and the like can be used. However, the operating system is not limited to the operating systems listed. Compliers that can be used as the compiler for generating the program used for processing of the present invention include Visual Basic (R), Visual C++ (R) and Visual Studio (R) of Microsoft Corporation, Borland (R) C++ Complier 5.5, Delphi (trademark) and C++ Builder (trademark) of Boland Corporation, and VisualAge for Java (trademark) of IBM Corporation, and any one of these can be used as the complier. A complier which does not support a GUI and is only of a CUI (character user interface) base can also implement functions of the present invention.

Figure 2:
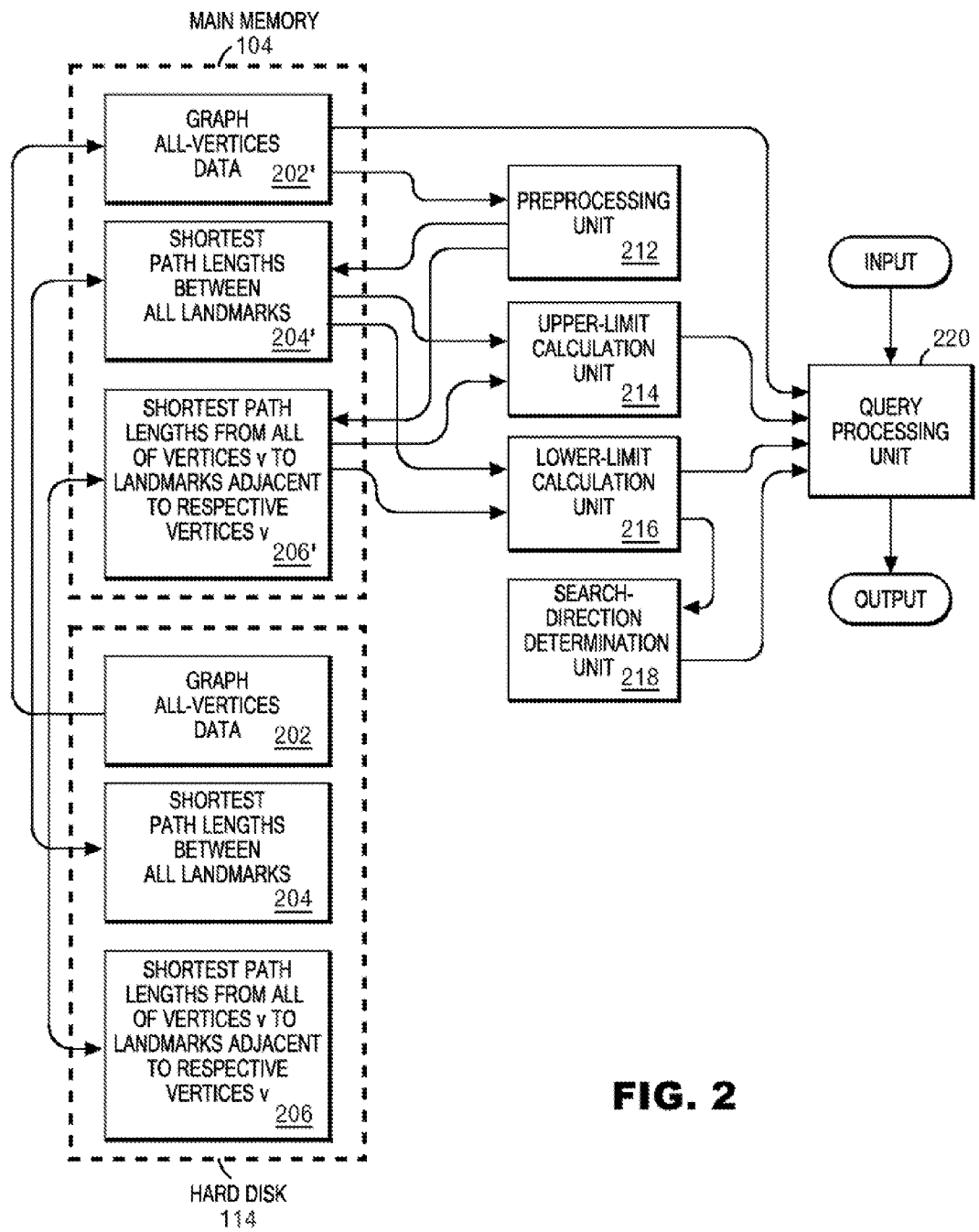
FIG. 2 is a block diagram of data and processing modules used for implementing the present invention.

FIG. 2 is a high-level functional block diagram of this embodiment example. In FIG. 2, graph all-vertices data 202 are data in the form of which a weighted graph is stored in the hard disk 114 in a computer-readable format, and the graph all-vertices data 202 stores data corresponding to respective vertices in the graph. In the case of a path-search application, the respective vertices correspond to respective locations. In this embodiment example, the graph is an undirected graph.

Figure 3:
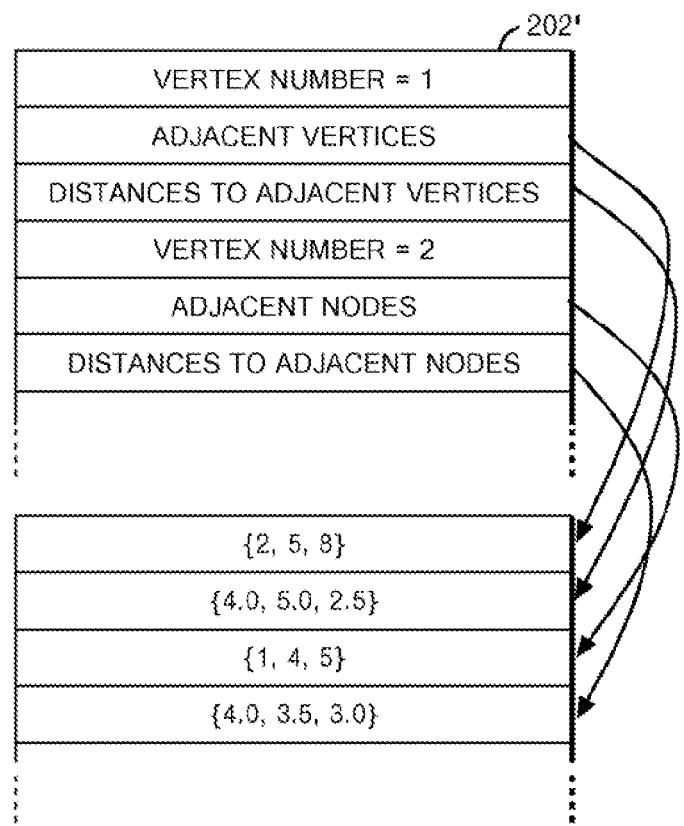
FIG. 3 is a diagram showing a logical structure of data on graph vertices which has been stored.

Preferably, serial numbers (vertex numbers) starting from 1 are given to the respective vertices of the graph, and, as shown in FIG. 3, a data format of each of the vertices includes: links to a list of the vertex numbers for vertices adjacent to each; and links to a list of distances from the each to the adjacent vertices. Note that the data format as described here is one of possible alternatives, and those skilled in the art can understand that a data format for a graph expression assumed by the present invention should not be limited to this data format.

Figure 4:
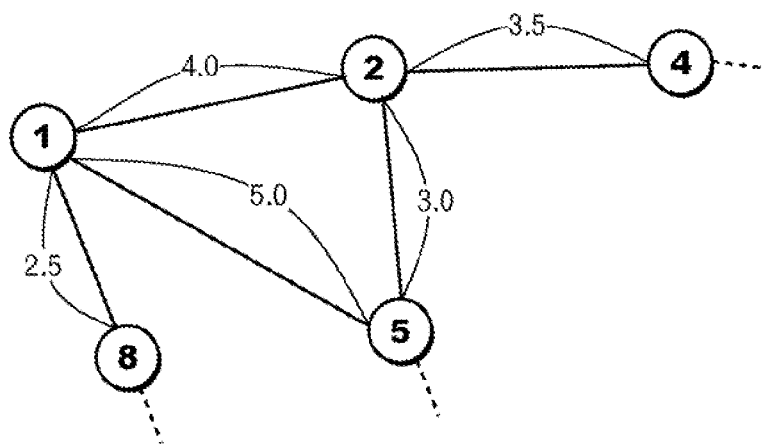
FIG. 4 is a diagram showing a part of a weighted graph.

In FIG. 4, an example of arrangement of the vertices in the graph is shown. In other words, in FIG. 4, the n-th vertex is expressed by encircled "n". In FIG. 4, a vertex 1 has vertices 2, 5 and 8 as adjacent vertices, and distances of the vertex 1 to these respective vertices are 4.0, 5.0 and 2.5. The vertex 2 has the vertex 1, a vertex 4 and the vertex 5 as adjacent vertices, and distances of the vertex 2 to these respective vertices are 4.0, 3.5 and 3.0. In FIG. 3, data structures of the vertices 1 and 2 are shown, the data structures having been loaded onto the main memory 104 from the hard disk 114 so as to be processed by a preprocessing unit 212.

Each of these structures is described in the following manner if it is written in a structure in the C language.

```
struct Node {
    int NodeID; // vertex number
    int *adjNodeList[ ]; // store vertex numbers of adjacent
vertices in form of array
        double *adjDistanceList[ ]; // store distances to adjacent
vertices in form of array
    };
```

When this structure is applied to the vertex 1, this structure is written as:

NodeID=1, *adjNodeList={2,5,8}, *adjDistanceList={4.0,5.0,2.5}.

Returning to FIG. 2, the preprocessing unit 212, an upper-limit calculation unit 214, a lower-limit calculation unit 216, a search-direction determination unit 218, and a query processing unit 220 are programs which have been written, preferably, in C or C++, and have been stored in the hard disk 114 so that these units can perform processing of this embodiment example. These units are respectively executed by action of the CPU 102 at the time of being loaded onto the main memory 104 from the hard disk 114 by operations of the operating system with the keyboard 120 or the mouse 122 being operated.

Additionally, when the preprocessing unit 212, the upper-limit calculation unit 214, the lower-limit calculation unit 216, the search-direction determination unit 218, and the query processing unit 220 are loaded onto the main memory 104, or, in response to a later operation by a user, the graph all-vertices data 202 is suitably loaded, as graph all-vertices data 202' as shown in FIG. 3, onto the main memory 104 from the hard disk 114 while a memory area is secured by calling up a function such as "malloc( )" of the C language. At this time, in order to speed up processing performed later, it is desirable that an entirety of the graph all-vertices data 202 be loaded onto the main memory 104.

However, if the capacity of the main memory 104 is insufficient, or if the number of vertices of the graph all-vertices data 202 is very large, the entirety of the graph all-vertices data 202 cannot be loaded on the main memory 104 in some cases. In such cases, the following method can be considered. An area of the main memory 104 as large as allowable is secured, and data as large as possible on the vertices of the graph all-vertices data 202 is stored in the area. Then, the preprocessing unit 212 searches for data on a certain vertex v in the vertices data 202' loaded on the main memory 104, and, if the data is found, the preprocessing unit 212 utilizes the data. If the data is not found, a certain grouping of vertices containing the data on the vertex which is not found is loaded on the main memory 104, and is substituted for a part of an area corresponding to the vertices data 202', whereby it is made possible for the preprocessing unit 212 to be able to refer to the data.

While a memory management routine as described above used for loading the graph all-vertices data 202 on the main memory 104 is supposed to be prepared in advance as necessary, the memory management routine can be implemented with a conventional technique by using an API function, a standard library function of the C language, or the like, and therefore, will not be described further in detail here.

Although this will be described later in detail, the preprocessing unit 212 preferably has a function of: reading data on the respective vertices from the graph all-vertices data 202' loaded on the main memory 104; generating data 204 on the shortest path lengths between all of landmarks, and data 206 on the shortest path lengths from all of any vertices v to k landmarks adjacent to the respective vertices v; and storing the data 204 in the hard disk 114 in a later readable form. Note that, preferably, the data 204 on the shortest path lengths between all of the landmarks, and the data 206 on the shortest path lengths from all of the vertices v to the k landmarks adjacent to the respective vertices v are loaded on the main memory 104 as data 204' and data 206', respectively, so that the data 204' and the data 206' can be accessed at high speed by the upper-limit calculation unit 214 and the lower-limit calculation unit 216.

The upper-limit calculation unit 214 has a function of calculating and providing upper limits of the shortest path lengths between vertices with a later described procedure by referring to the data 204' on the shortest path lengths between all of the landmarks, and the data 206' on the shortest path lengths from all of the vertices v to the k landmarks adjacent to the respective vertices v, which have been loaded on the main memory 104. The upper-limit calculation unit 214 is implemented as a subroutine or a function which returns values of the upper limits preferably in the form of double-precision floating-point numbers by being called up by another program or module.

The lower-limit calculation unit 216 has a function of calculating and providing lower limits of the shortest path lengths between vertices with a later described procedure by referring to the data 204' on the shortest path lengths between all of the landmarks, and the data 206' on the shortest path lengths from any vertex v to k landmarks adjacent to the vertex v, which have been loaded on the main memory 104. The lower-limit calculation unit 216 is implemented as a subroutine or a function which returns values of the lower limits preferably in the form of double-precision floating-point numbers by being called up by another program or module.

The query processing unit 220 has a function of searching, in response to specification of actual starting vertex and destination vertex, for the shortest path between those vertices, and returning a result of the searching. The query processing unit 220 has a function of performing a path search by calling up the upper-limit calculation unit 214 and the lower-limit calculation unit 216 to utilize the upper limits and the lower limits, and, at the same time, by utilizing the search-direction determination unit 218 to determine a search direction.

Figure 5:
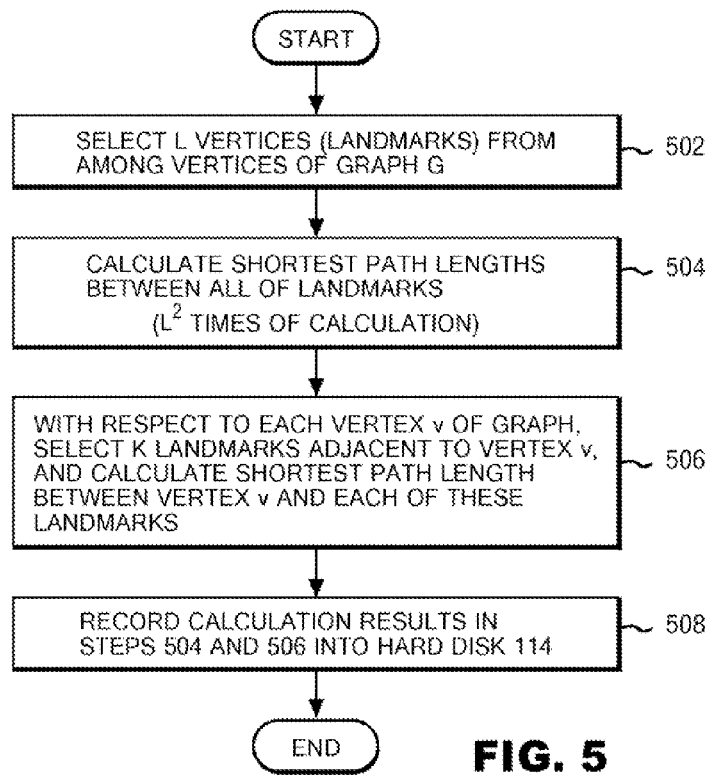
FIG. 5 is a flowchart of processing of a preprocessing unit on vertex data of a graph.

Operations of the above-mentioned respective processing modules will be described below with reference to flowcharts. When FIG. 5 is referred to, an operational flowchart of the preprocessing unit 212 is shown. In step 502 in FIG. 5, L landmarks are selected from among vertices of a graph G. It is desirable that the L landmarks be arranged in a manner allowing the landmarks to be distributed as homogeneously as possible. According to an experiment made by the present inventors, it was found that, when the number of the vertices of the graph G is denoted as N, it is favorable if the number L of the landmarks is set to about $N^{1/2}$, or not less than $N^{1/2}$.

One of methods of selecting the landmarks is as described below.

The smallest rectangle containing all of the vertices of the graph is taken.

The rectangle is quadrisected into four rectangles by two straight lines being parallel to longitudinal and lateral sides of the rectangle, and passing through the center of the rectangle.

If each of areas into which the rectangle is quadrisected contains not less than a prescribed number of vertices, each of the areas is again quadrisected.

The above steps are repeated thereafter.

After the completion of the above procedure, vertices nearest to the center of areas of the respective smallest rectangles obtained by the above steps are selected as the landmarks.

Alternatively, although being a rougher method, the landmarks may be selected by utilizing a random number function with which the C language is equipped as a library. For example, by utilizing a random function, after random(N) is repeated at least L times so that different L vertices can be selected, vertices having the vertex numbers corresponding to integers obtained as a result may be set as the landmarks.

After the L landmarks have been thus-selected in step 502, the shortest path lengths between all of the selected L landmarks are calculated in step 504. This calculation of the shortest path lengths may be performed, for example, by using a publicly known method such as the Dijkstra method. The shortest path lengths between all of the L landmarks practically require $L^2$ times of calculation. Hereinafter, the thus-calculated shortest path length for a landmark Lv and a landmark Lw will be expressed as d(Lv,Lw). A value of the thus-calculated d(Lv,Lw) is temporarily stored in an appropriate array variable. A group of data contained in the array variable and expanded on the main memory 104 at the time of the completion of step 504 is the data 204' on the shortest path lengths between all of the landmarks.

In step 506, with respect to each vertex v in the graph, k landmarks adjacent to the vertex v are selected, and the shortest path lengths from the vertex v to these respective k landmarks are calculated. Selection of these adjacent k landmarks is performed, for example, by calculating the shortest path lengths from the vertex v to all of the landmarks, and selecting the first k landmarks from among the landmarks arranged by the ascending order of the shortest path lengths. Here, a publicly known path-search method such as the Dijkstra method can be used also in this calculation of these shortest path lengths. According to an experiment made by the present inventors, it was found that k=4 or so is desirable. Hereinafter, the thus-calculated shortest path length with respect to the vertex v and any landmark Lw will be expressed as d(v,Lw). Thus, $k_v$ landmarks are associated with each vertex v. A value of the thus-calculated d(v,Lw) is temporarily stored in an appropriate array variable. A group of data contained in the array variable and expanded on the main memory 104 at the time of the completion of step 506 is the data 206' on the shortest path lengths from all of the vertices v to landmarks adjacent to the respective vertices v.

It should be noted that a vertex referred to as "each vertex v in the graph" here does not exclude a vertex selected as any one of the landmarks.

Figure 6:
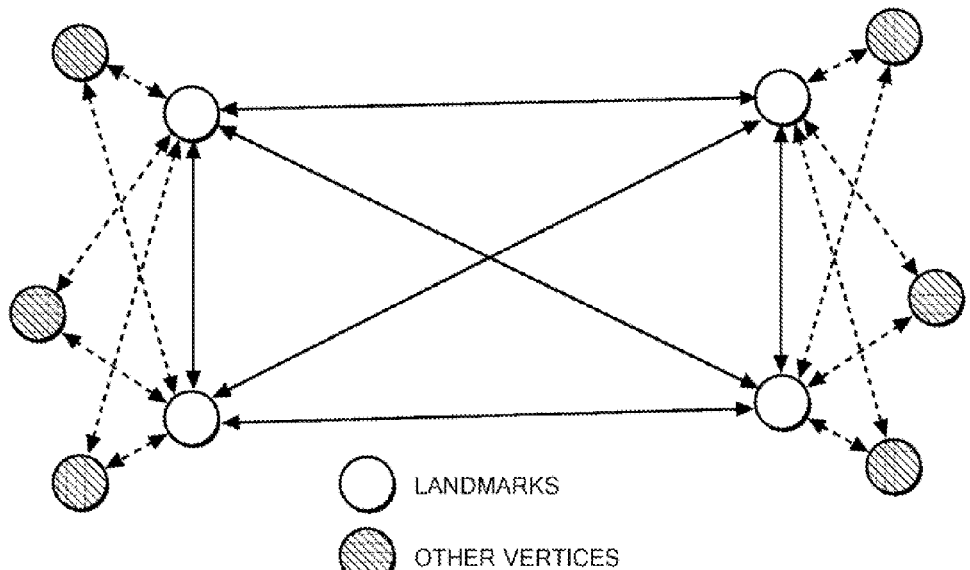
FIG. 6 is a diagram showing association of landmarks with other vertices.

FIG. 6 is a diagram schematically showing relations of landmarks with the other vertices. To make it easier to understand the relations, the number of vertices shown in the drawing is made much smaller than that of an actual graph. In FIG. 6, white circles are the landmarks, and the number L of the landmarks here equals 4. The other vertices are indicated by black circles, and, as shown in the drawing, k equals 2 in the example of this drawing because two landmarks are associated with each one of the black circles.

In step 508, calculation results which have been calculated in steps 504 and 506 and exist as the data 204' and the data 206' on the main memory 104 are recorded into the hard disk 114 as the data 204 and the data 206, respectively, by using library functions such as read( ) and write( ) of the C language. If this is more specifically described, the shortest path lengths d(Lv,Lw) with respect to all of combinations of any two landmarks Lv and Lw are recorded, as the calculation result in step 504, into the hard disk 114 as the data 204 on the shortest path lengths between all of the landmarks, whereby, when this data is loaded as the data 204' onto the main memory 104 from the hard disk 114, the upper-limit calculation unit 214 and the lower-limit calculation unit 216 are enabled to retrieve, with respect to any two landmarks Lv and Lw, the shortest path length d(Lv,Lw).

Likewise, the shortest path lengths $d(v, L_{Vk})$ with respect to $L_{Vk}$ landmarks associated with any vertex v of the graph are recorded, as the calculation result in step 506, into the hard disk 114 as the distance data 206 on the shortest path lengths from all of the vertices v to the k landmarks adjacent to the respective vertices v, whereby, when this data is loaded as the data 206' onto the main memory 104 from the hard disk 114, the upper-limit calculation unit 214 and the lower-limit calculation unit 216 are enabled to retrieve, with respect to any vertex v, the respective shortest path lengths $d(v, L_{Vk})$ from the vertex v to the k landmarks associated with the vertex v for being adjacent to the vertex v.

Note that, although the flowchart in FIG. 5 indicates that, in step 508, the calculation results in steps 504 and 506 are recorded into the hard disk 114 at one time after the completion of steps 504 and 506, those skilled in the art will understand that: the calculation result in step S504, and the calculation result in step S506 may be recorded into the hard disk 114 immediately after the completion of calculation in step

504, and immediately after the completion of calculation in step 506, respectively; and there is no substantial difference from processing of the flowchart in FIG. 5 if this manner is applied.

Here, with reference to FIG. 9, a principle of calculation based on quadrangle inequalities will be described as a premise for describing calculation processing of the upper-limit calculation unit 214 and the lower-limit calculation unit 216 with reference to FIGS. 7 and 8. In FIG. 9, four vertices which are a vertex v, a landmark Lv adjacent to the vertex v, a vertex w, and a landmark Lw adjacent to the vertex w are illustrated. If these vertices are connected with lines, it is definite that some quadrangle is formed although the quadrangle is not necessarily a rectangle. If all of vertices of this quadrangle are on the same one plane, a proposition that one edge is always smaller than the total length of the other three edges in any quadrangle is unconditionally true for this quadrangle. However, if the vertices of this quadrangle are not on the same one plane, it cannot be always said that one edge thereof is smaller than the total length of the other three edges thereof. However, if the shortest path length is adopted as an index used for measuring a distance between edges, the proposition that one edge is always smaller than the total length of the other three edges in any quadrangle is true again for this quadrangle. Consequently, if a line connecting the vertex v and the vertex w is considered as the one edge, the following relational expression is true.

$$d(Lv,v)+d(Lv,Lw)+d(w,Lw)>=d(v,w).$$

Because it can be said from this expression that $d(Lv,v)+d(Lv,Lw)+d(w,Lw)$ is always larger than $d(v,w)$, an upper limit of $d(Lv,v)+d(Lv,Lw)+d(w,Lw)$ can be adopted as an upper limit of $d(v,w)$. In a flowchart in FIG. 7, the upper limit of $d(v,w)$ is calculated by using this expression.

Next, if a line connecting the landmark Lv and the landmark Lw is considered as the one edge, $d(Lv,v)+d(v,w)+d(w,Lw)>=d(Lv,Lw)$.

From this expression, $d(v,w)>=d(Lv,Lw)-d(Lv,v)-d(w,Lw)$.

Because it can be said from this expression that $d(Lv,Lw)-d(Lv,v)-d(w,Lw)$ is always smaller than $d(v,w)$, a lower limit of $d(Lv,Lw)-d(Lv,v)-d(w,Lw)$ can be adopted as a lower limit of $d(v,w)$. In a flowchart in FIG. 8, the lower limit of $d(v,w)$ is calculated by using this expression.

Here, with reference to the flowchart in FIG. 7, calculation processing of the upper-limit calculation unit 214 will be described.

Figure 7:
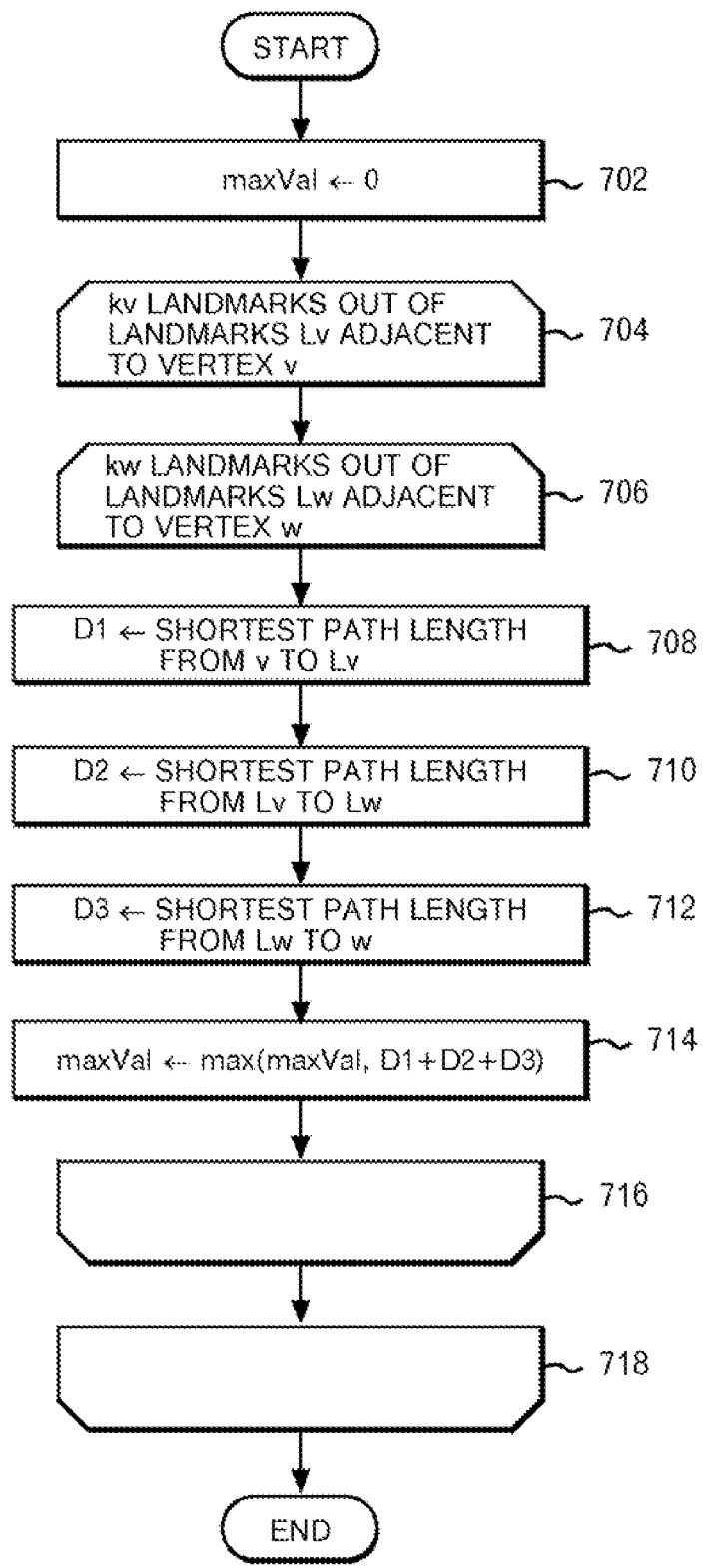
FIG. 7 is a flowchart of processing of an upper-limit calculation unit.

In step 702 in FIG. 7, a variable named MaxVal is initially set to 0. This variable is, for example in the C language, a variable declared as "double" of a double precision floating point.

In step 704, with respect to any vertex v, $k_v$ landmarks from among landmarks Lv associated with the vertex v for being adjacent to the vertex v are selected. The association as mentioned here has been already prepared previously, as the data 206' on distances of all of vertices v with k landmarks adjacent to the respective vertices v which is shown in FIG. 2, by processing of the preprocessing unit 212, and is retrieved from the data 206' as one corresponding to the vertex v.

Likewise, in step 706, with respect to any vertex w, $k_w$ landmarks from among landmarks Lw associated with the vertex w for being adjacent to the vertex w are selected. In one embodiment example, $k_v=k_w=4$.

Then, in step 708, the shortest path length from the vertex v to any one of the thus-selected $k_v$ landmark Lv is retrieved from the data 206', and a value thereof is stored in a variable D1 of a double precision floating point. In step 710, the shortest path length from the foregoing one of the landmarks Lv to any one of the thus-selected $k_w$ landmarks Lw is retrieved from the data 204', and a value thereof is stored in a variable D2 of a double precision floating point. In step 712, the shortest path length from the foregoing one of the landmarks Lw to the vertex w is retrieved from the data 206', and a value thereof is stored in a variable D3 of a double precision floating point number.

In step 714, D1+D2+D3 is calculated, and is compared with a value stored as MaxVal, and the larger of these values is set as MaxVal.

In this manner, steps 708 to 714 are looped with respect to the $k_v$ landmarks Lv retrieved in association with the vertex v, and the $k_w$ landmarks Lw retrieved in association with the vertex w, and a value eventually given to MaxVal is the upper limit of $d(v,w)$. In other words, steps 706 to 716 is an inner loop with respect to Lw, and steps 704 to 718 is an outer loop with respect to Lw. When $k_v=k_w=4$, steps 708 to 714 are executed 16 times because 4×4=16.

However, a calculation amount sometimes is too large if $k^2$ times of calculation is performed with respect to the vertex v and the vertex w. For this reason, a scheme of reducing the number of times of looping the calculation to $k'_v \times k'_w$ by extracting $k'_v$ landmarks adjacent to the vertex v, and $k'_w$ landmarks adjacent to the vertex w can be applied.

At this time, $k'_v <= k_v$ and $k'_w <= k_w$.

Based on various trials made by the present inventors, it was found that a favorable result is brought about if $k'_v = k$ and $k'_w = 1$.

The thus-calculated value is returned, to a program for calling up the upper-limit calculation unit 214, as the upper limit of $d(v,w)$ corresponding to the vertex v and the vertex w. The program for calling up the upper-limit calculation unit 214 is, representatively, the query processing unit 220.

Next, with reference to the flowchart in FIG. 8, processing of the lower-limit calculation unit 216 will be described.

Figure 8:
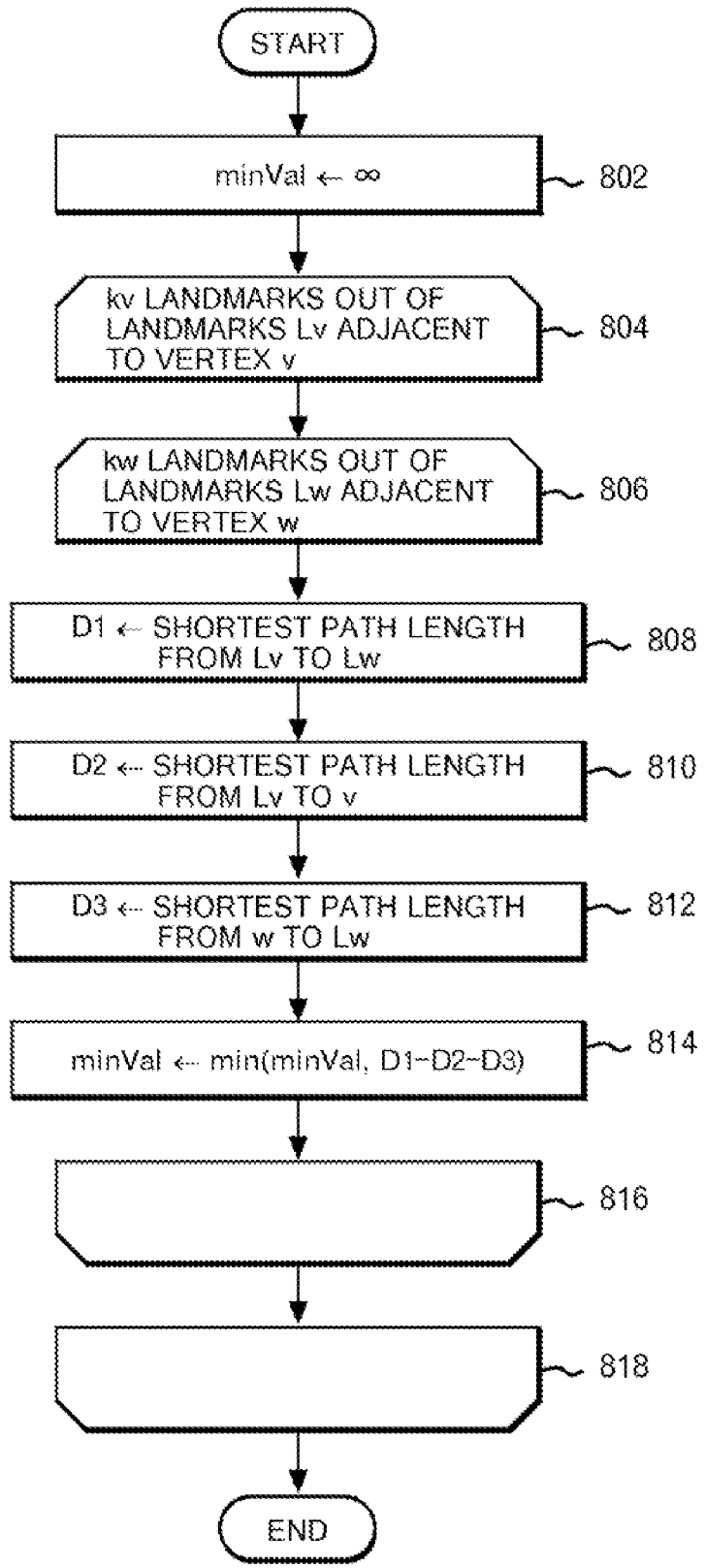
FIG. 8 is a flowchart of processing of a lower-limit calculation unit.
Figure 9:
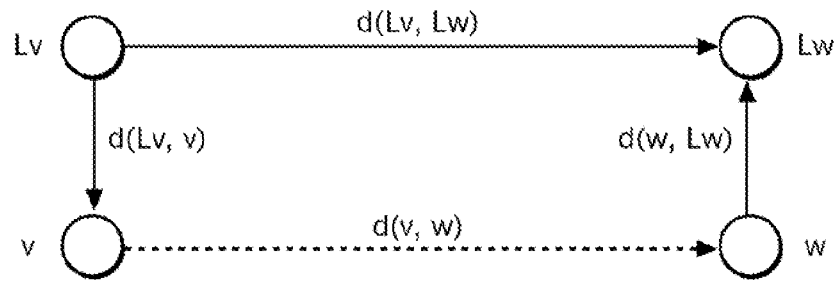
FIG. 9 is a diagram showing positional relationships among landmarks and other vertices in quadrangle inequalities.

In step 802 in FIG. 8, a variable named MinVal is initially set to ∞. This variable is, for example in the C language, a variable declared as "double" of a double precision floating point. Although it is realistically impossible for a variable on a computer to assume a value of ∞, it is supposed here that a value sufficiently larger than a value that can be a path length is previously set.

In step 804, with respect to any vertex v, $k_v$ landmarks from among landmarks Lv associated with the vertex v for being adjacent to the vertex v are selected. The association as mentioned here has been already prepared previously, as the data 206' on distances from all of the vertices v with the k landmarks adjacent to the respective vertices v which is shown in FIG. 2, by processing of the preprocessing unit 212, and is retrieved from the data 206' as data corresponding to the respective vertices v.

Likewise, in step 806, with respect to any vertex w, $k_w$ landmarks from among landmarks Lw associated with the vertex w for being adjacent to the vertex w are selected. In a suitable embodiment example, $k_v=k_w=4$.

In step 808, the shortest path length from any one of the thus-selected $k_v$ landmarks Lv to any one of the thus-selected $k_w$ landmarks Lw is retrieved from the data 204', and a value thereof is stored in a variable D1 of a double precision floating point. In step 810, the shortest path length from the foregoing one of the landmark Lv to the vertex v is retrieved from the data 206', and a value thereof is stored in a variable D2 of a double precision floating point. In step 812, the shortest path length from the vertex w to the foregoing one of the landmark Lw is retrieved from the data 206', and a value thereof is stored in a variable D3 of a double precision floating point.

In step 814, D1–D2–D3 is calculated, and is compared with a value named as MinVal, and the larger of these values is set as MinVal.

In this manner, steps 808 to 814 are looped with respect to the $k_v$ landmarks Lv retrieved in association with the vertex v, and the $k_w$ landmarks Lw retrieved in association with the respective vertices w, and a value eventually given to MinVal is the lower limit of d(v,w). In other words, steps 806 to 816 is an inner loop with respect to Lw, and steps 804 to 818 is an outer loop with respect to Lw. When $k_v=k_w=4$, steps 808 to 814 are executed 16 times because 4×4=16.

As in the case with the calculation of the upper limit, a calculation amount sometimes is too large if $k^2$ times of calculation is performed with respect to the vertex v and the vertex w. For this reason, a scheme of reducing the number of times of looping the calculation to $k'_v \times k'_w$ by extracting $k'_v$ landmarks adjacent to the vertex v, and $k'_w$ landmarks adjacent to the vertex w can be applied. At this time, $k'_v <= k_v$ and $k'_w <= k_w$. It is also the same that a favorable result is brought about if $k'_v = k$ and $k'_w = 1$.

The thus-calculated value is returned, to programs for calling up the lower-limit calculation unit 216, as the lower limit of d(v,w) corresponding to the vertex v and the vertex w. The programs for calling up the lower-limit calculation unit 216 are, representatively, the search-direction determination unit 218 and the query processing unit 220.

It has been described that, in each of the calculation loops for the upper limit and the lower limit, a scheme of setting $k'_v = k$ and $k'_w = 1$ can be applied. However, it should be noted that, if such setting is applied, $k'_v$ and $k'_w$ should be fixedly set previously before performing the calculation of the upper limit and the lower limit, and should not be subject to change thereafter. For example, with respect to any vertex p, any vertex q and any vertex r, when upper and lower limits of d(p,q) are calculated, these upper and lower limits are calculated by using $k'_v$ landmarks adjacent to the vertex p, and $k'_w$ landmarks adjacent to the vertex q, and, when upper and lower limits of d(q,r) are calculated, these upper and lower limits are calculated by using $k'_v$ landmarks adjacent to the vertex q, and $k'_w$ landmarks adjacent to the vertex r.

It might be considered possible to speed up calculation of data by: previously executing the calculation routines in FIGS. 7 and 8 for all of the vertices v and w of the graph; previously recording upper limits and lower limits of d(v,w) in the hard disk 114; loading the upper limits and the lower limits upon at the time of execution; and, in A* search, instead of calling up the calculation routines in FIGS. 7 and 8, looking up, with values of v and w, a value existing on the main memory 104. Actually, in many cases, looking up requires a shorter time than carrying out calculation on the spot. However, the manner as described here can be applied only to a graph having a very small number of vertices. In other words, generally, the number of locations expressed as vertices of a graph is at least about $N=3 \times 10^5$ even in a map which is not very fine. In order to prepare such data for combinations of v and w, the number of the combinations is at least $N^2=9 \times 10^{10}$, and, if it is taken into consideration that this number should be multiplied by k mentioned above, and that a double precision floating-point number is expressed with 8 bytes, it will be understood that recording upper limits and lower limits require a storage capacity of not lass than several terabytes even for the map which is not very fine.

Next, with reference to a flowchart in FIG. 10, processing of the search-direction determination unit 218 will be described. Provided to the search-direction determination unit 218 are two vertices s and t of a graph. The search-direction determination unit 218 is configured to be called up by the query processing unit 220, and s and t are, representatively, a starting point and a terminal of a path which should be searched for.

Figure 10:
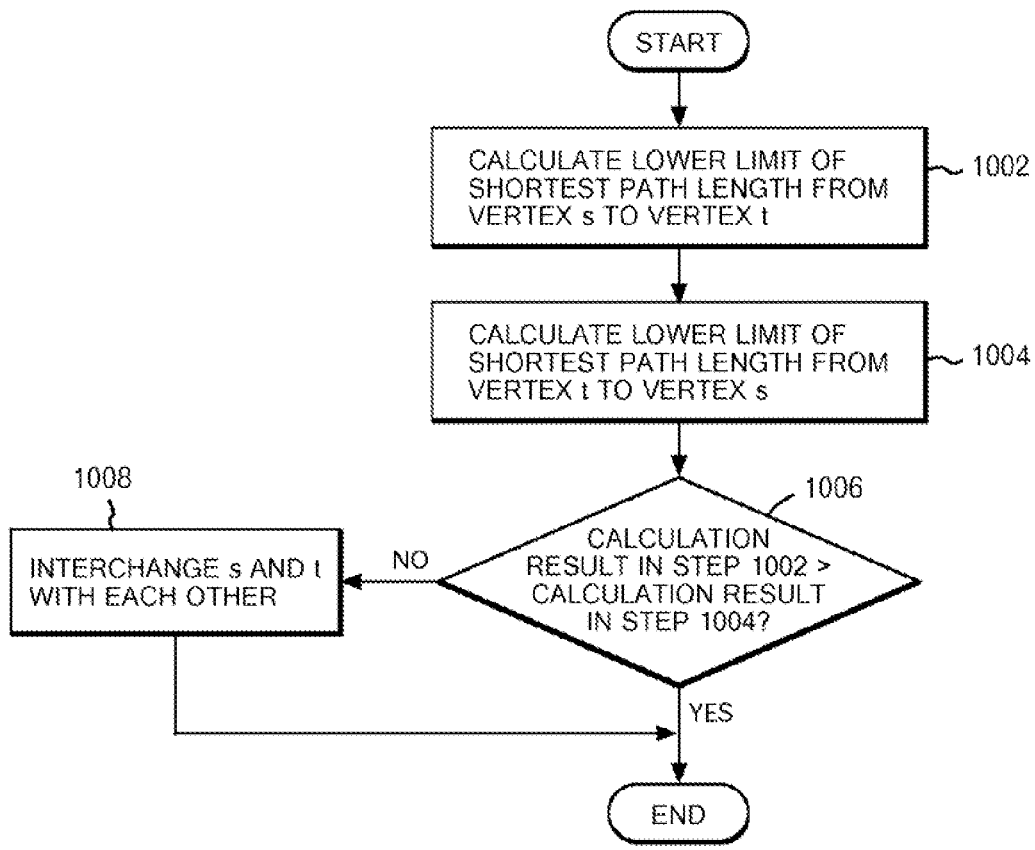
FIG. 10 is a flowchart of processing of a search-direction determination unit.

Here, in step 1002 in FIG. 10, a lower limit of the shortest path length from the vertex s to the vertex t is found by calling up the lower-limit calculation unit 216. Likewise, in step 1004, a lower limit of the shortest path length from the vertex t to the vertex s is found by calling up the lower-limit calculation unit 216.

In step 1006, the lower limit of the shortest path length from the vertex s to the vertex t, and the lower limit of the shortest path length from the vertex t to the vertex s are compared with each other. In step 1008, s and t are switched to each other if the lower limit of the shortest path length from the vertex s to the vertex t is larger than the lower limit of the shortest path length from the vertex t to the vertex s. The reason for switching s and t to each other in accordance with sizes of the lower limits of these shortest path lengths depends on an empirical rule, which was found by the present inventors, that, if the lower limit of the shortest path length from the vertex s to the vertex t is larger than the lower limit of the shortest path length from the vertex t to the vertex s, accuracies of upper and lower limits of a path heading for s from t are often higher than accuracies of upper and lower limits of a path heading for t from s. In other words, increase of a search speed of A* search can be promoted by using the upper and lower limits having higher accuracies.

Figure 11:
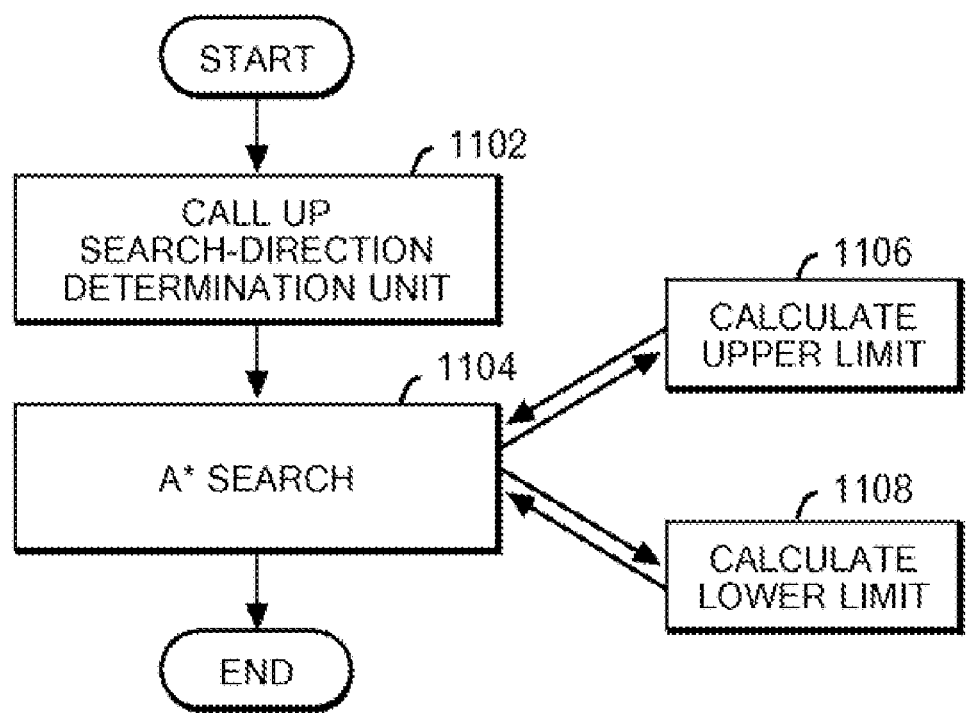
FIG. 11 is a flowchart of processing of a query processing unit.

FIG. 11 is a flowchart showing processing of the query processing unit 220 used for finally searching for a path with results having been prepared so far.

Inputs provided to the query processing unit 220 are the vertex s of the graph as a starting point, and the vertex t of the graph as a terminal, and the query processing unit 220 is configured to search for the shortest path between these vertices, and provide this shortest path as an output.

At the time of executing the query processing unit 220, the graph all-vertices data 202, the data 204 on the shortest path lengths between all of the landmarks, and the data 206 on the shortest path lengths from all of the vertices v to landmarks adjacent to the respective vertices v are supposed to have been previously loaded as the data 202', the data 204' and the data 206', respectively, onto the main memory 104 from the hard disk 114.

In step 1102, the search-direction determination unit 218 described in connection with FIG. 10 is called up with data on the vertices s and t. As a result, t and s are switched to each other in accordance with the conditions of the vertices s and t, vertices s and t thus-obtained by the switching are delivered to an A* search routine in step 1104.

Next, the A* search routine in step 1104 will be described by using a pseudo code similar to the C language.

In the following pseudo code, with respect to any vertex v and any vertex w, d(v,w) denotes the shortest path length from v to w, and w(v,w) denotes a length of edges connecting v and w to each other.

Firstly, so as to find the shortest path from the starting point s to the terminal t, the following are defined with respect to each of the vertices v.

Here, $\pi(v)$ denotes a lower limit of d(v,t). This lower limit is found by calling up the lower-limit calculation unit 216 with respect to v and t in step 1108 in the flowchart of FIG. 11.

Furthermore, when it is intended that the shortest path from the starting point s to the terminal t be found, the following are defined as initial settings with respect to each of the vertices v.

```
π(v): lower limit of d(v,t);
k(v): k(s) := π(s) when v = s, and k(v) := ∞ when v ≠ s ;
d(v): d(v) := 0 when v = s, and d(v) := ∞ when v ≠ s ;
prev(v) = NULL; and
vertex set S = {s}
```

On this premise, search processing is performed in the following manner:

```
while (S is not empty) {
        from S, remove vertex v giving smallest value of k(v)
        for (perform following operations with respect to all
of edges (v,w) going out from v) {
                if (k(w) > k(v) + w(v,w) − π(v) + π(w)) {
                        k(w) := k(v) + w(v,w) − π(v) + π(w);
                        d(w) := d(v) + w(v,w);
                        prev(w) := v;
                        if (d(w) + π(w) <= min(upper limit of
d(s,t),d(t)))
                                {S ← S∪{w};}
                }
        }
}
```

A value finally assigned to d(t) is the shortest path length. Additionally, when an upper value of d(s,t) is found in this processing presented in the pseudo code, the upper-limit calculation unit 214 is called up with respect to s and t as shown in step 1106 in FIG. 11.

At this point, if vertices assigned to prev(t), prev(t') and so on are denoted as t', t" and so on, respectively, "t←t'←t"← . . . ←s" is the shortest path.

The present inventors performed an experiment as described below so as to confirm effects of the present invention. Firstly, seven weighted graphs as shown in the table below were prepared. Additionally, k=4, $k_w$=4 and $k_v$=1 were used as parameters. Additionally, landmarks are arranged in the following manner although this manner has been already described.

The smallest rectangle containing all of the vertices of the graph is taken.

The rectangle is quadrisected into four rectangles by two straight lines being parallel to longitudinal and lateral sides of the rectangle, and passing through the center of the rectangle.

If each of areas into which the rectangle is quadrisected contains not less than a prescribed number of vertices, each of the areas is again quadrisected.

The above steps are repeated thereafter.

After the completion of the above procedure, vertices nearest to the centers of the respective smallest areas thus-obtained are selected as the landmarks.

TABLE 1

|  | Number of vertices | Number of edges |
|---|---|---|
| Graph 1 | 3,400,000 | 10,000,000 |
| Graph 2 | 330,000 | 860,000 |
| Graph 3 | 580,000 | 1,350,000 |
| Graph 4 | 400,000 | 1,000,000 |
| Graph 5 | 1,610,000 | 3,980,000 |
| Graph 6 | 1,950,000 | 5,450,000 |
| Graph 7 | 2,070,000 | 5,160,000 |

To Graph 1, the method of Goldberg and the method of this embodiment example were applied respectively under the conditions as shown in the table below. In the method of Goldberg and the method of this embodiment example, clusters are not particularly used, and the column for "number of landmarks or clusters" should therefore be interpreted as one for "number of landmarks." Here, it is shown that the method of this embodiment example apparently exhibited superior effects in the search time and in the number of searched vertices. Note that, in each of this table and the others shown further below, the column for "search time" represents a level of a performance in a case where a performance of the Dijkstra method is set to 1. In other words, a time actually required is proportional to an inverse of a value shown in this column for "search time." Likewise, the column for "number of vertices searched for" represents a level of how small the number of searched vertices is in a case where the number of searched vertices in the Dijkstra method is set to 1. Consequently, the number of actually searched vertices is proportional to an inverse of a value shown in this column for "number of searched vertices." Furthermore, it is shown that the method of this embodiment example is superior to the method of Goldberg in terms of necessary storage capacity after preprocessing.

TABLE 2

Graph 1

|  | Number of landmarks or clusters | Necessary storage capacity after preprocessing | Search time | Number of searched vertices |
|---|---|---|---|---|
| Technique of Goldberg | 16 | 256 MB | 13 times | 43 times |
| Technique of embodiment example | 7,000 | 177 MB | 69 times | 37 times |

As to Graphs 2 and 3, as shown in the tables below, it is shown that the method of this embodiment example is superior to the method of Goldberg in search performances.

TABLE 3

Graph 2

|  | Number of landmarks or clusters | Necessary storage capacity after preprocessing | Search time | Number of searched vertices |
|---|---|---|---|---|
| Technique of Goldberg | 16 | 21 MB | 9.1 times | 31 times |
| Technique of embodiment example | 2,000 | 19 MB | 22 times | 28 times |

TABLE 4

Graph 3

| | Number of landmarks or clusters | Necessary storage capacity after preprocessing | Search time | Number of searched vertices |
|---|---|---|---|---|
| Technique of Goldberg | 16 | 38 MB | 13 times | 45 times |
| Technique of embodiment example | 4,000 | 46 MB | 23 times | 26 times |

Next, as described below, an experiment for comparing the method of Maue and the method of the present invention was performed. Note that, in the method of this embodiment example, clusters are not used, and the column for "number of landmarks or clusters" should therefore be interpreted as one for "number of landmarks." On the other hand, in the method of Maue, clusters are used instead of landmarks, and the column for "number of landmarks or clusters" should therefore be interpreted as one for "number of clusters."

As shown in the following, results of applying the method of Maue and the method of this embodiment example also indicate that the method of this embodiment example exhibits substantially superior effects. It is shown that this embodiment example is superior to the method of Maue also in terms of necessary storage capacity after preprocessing.

TABLE 5

Graph 4

| | Number of landmarks or clusters | Necessary storage capacity after preprocessing | Search time | Number of searched vertices |
|---|---|---|---|---|
| Technique of Maue | 4,000 | 94 MB | 4.55 times | 9.68 times |
| Technique of embodiment example | 4,000 | 39 MB | 30.4 times | 41.3 times |

Comparison results of applying the method of Maue and the method of this embodiment example to Graphs 5 to 7 are as shown below. It is shown that, in each of these experiment examples, the method of this embodiment example exhibited more conspicuous effects than the method of Maue.

TABLE 6

Graph 5

| | Number of landmarks or clusters | Necessary storage capacity after preprocessing | Search time | Number of searched vertices |
|---|---|---|---|---|
| Technique of Maue | 7,000 | 282 MB | 5.6 times | 10.9 times |
| Technique of embodiment example | 7,000 | 136 MB | 30.1 times | 37.9 times |

TABLE 7

Graph 6

| | Number of landmarks or clusters | Necessary storage capacity after preprocessing | Search time | Number of searched vertices |
|---|---|---|---|---|
| Technique of Maue | 4,000 | 95 MB | 4.96 times | 6.43 times |
| Technique of embodiment example | 4,000 | 78 MB | 19.6 times | 25.7 times |

TABLE 8

Graph 7

| | Number of landmarks or clusters | Necessary storage capacity after preprocessing | Search time | Number of searched vertices |
|---|---|---|---|---|
| Technique of Maue | 7,000 | 284 MB | 8.11 times | 14.1 times |
| Technique of embodiment example | 7,000 | 148 MB | 60.5 times | 49.3 times |

Note that, although the description has been given by assuming the graph as an undirected graph in the abovementioned embodiment example, the present invention can be applied also to a directed graph. In that case, if a path that should be searched for is reverse to a direction of an edge of the directed graph, processing of avoiding the edge and searching for another edge is performed.

Additionally, although processing of searching data on the graph in a stand-alone environment has been described in the abovementioned embodiment example, another configuration may be adopted where: a searchable environment is prepared by executing the above described processing on a Web server; and a search query from a client computer is accepted in a phase of providing an input to the query processing unit 220 shown in FIG. 2; and, in a phase of having an output from the query processing unit 220, a search result is transmitted to the client computer from which the search query has been accepted.

Additionally, with recent enhancement in performances of mobile phones, a mobile phone having a disk capacity of not less than 1 GB, and a high-speed CPU has appeared. In such a mobile phone, it is possible to apply a configuration where: an entirety of the graph all-vertices data 202, the data 204 on the shortest path lengths between all of landmarks, the data 206 on the shortest path lengths from all of vertices v to k landmarks adjacent to the respective vertices v, the upper-limit calculation unit 214, the lower-limit calculation unit 216, the search-direction determination unit 218, and the query processing unit 220, which are shown in FIG. 2, is stored in the disk; search in a standalone state only with the mobile phone is performed; and a result of the search is displayed on a screen of the mobile phone.

Furthermore, it should be understood that the technique for searching a graph according to the present invention can be applied to a path search on any applications, such as car navigation, map search and rail-road route search, in each of which vertices are expressed as a weighted graph. In a particular embodiment of the invention, vertices represent network peers having network paths within a computer network, such that shortest path lengths are the shortest network path lengths between the network peers.

For example, the invention may be a computer program embodied in computer-readable memory allowing a computer to perform a path search on a weighted graph representing a plurality of network peers utilizing upper limits and lower limits of the shortest path lengths d(v,w) each found between any two network peers v and w. The program causing the computer to execute the functions of: selecting a network peers as landmarks out of the plurality of network peers in the graph; calculating values of the shortest path lengths d(Lv, Lw) each found between any two network peers Lv and Lw selected as the landmarks, and recording these values in the memory; selecting one or a plurality of landmarks Lv adjacent to the network peer v in association with the shortest path lengths from any network peer v in the graph, calculating values of the shortest path lengths d(v,Lv) from the network peer v to the landmarks Lv, and recording these values in the memory means; calculating an upper limit of d(Lv,v)+d (Lv, Lw)+d(w,Lw) for any two network peers v and w in the graph, by reading from the memory values of one or a plurality of landmarks Lv selected in association with the network peer v as well as one or plurality of landmarks Lw selected in association with the network peer w, and providing the upper limit as an upper limit of d(v,w); and calculating a lower limit of d(Lv,Lw)−d(Lv,v)−d(w,Lw) for any two network peers v and w in the graph, by reading from the memory values of one or a plurality of landmarks Lv selected in association with the network peer v as well as one or plurality of landmarks Lw selected in association with the network peer w, and providing the lower limit as a lower limit of d(v,w).

Although the preferred embodiment of the present invention has been described in detail, it should be understood that various changes, substitutions and alternations can be made therein without departing from spirit and scope of the inventions as defined by the appended claims.

That which is claimed is:

1. A computer program embodied in non-transitory computer-readable memory allowing a computer to perform a path search on a weighted graph representing a plurality of network peers utilizing upper limits and lower limits of the shortest path lengths d(v,w) each found between any two network peers v and w, the program causing the computer to execute the functions of:
   selecting network peers as landmarks out of the plurality of network peers in the graph based upon their substantially homogeneous distribution within the graph;
   calculating values of the shortest path lengths d(Lv,Lw) each found between any two network peers Lv and Lw selected as the landmarks, and recording these values in memory;
   selecting one or a plurality of landmarks Lv adjacent to the network peer v in association with the shortest path lengths from any network peer v in the graph, calculating values of the shortest path lengths d(v,Lv) from the network peer v to the landmarks Lv, and recording these values in the memory;
   calculating an upper limit of d(Lv,v)+d(Lv,Lw)+d(w,Lw) for any two network peers v and w in the graph, by reading from the memory values of one or a plurality of landmarks Lv selected in association with the network peer v as well as one or plurality of landmarks Lw selected in association with the network peer w, and providing the upper limit as an upper limit of d(v,w); and calculating a lower limit of d(Lv,Lw)−d(Lv,v)−d(w,Lw) for any two network peers v and w in the graph, by reading from the memory values of one or a plurality of landmarks Lv selected in association with the network peer v as well as one or plurality of landmarks Lw selected in association with the network peer w, and providing the lower limit as a lower limit of d(v,w).

2. The program according to claim 1, wherein, when N denotes the total number of the network peers represented in the graph, the landmarks are selected so that the number of the landmarks can be not less than $N^{1/2}$.

3. The program according to claim 1, wherein, in association with the shortest path lengths from any network peer v in the graph, four landmarks are selected as the landmarks adjacent to the network peer v.

4. The program according to claim 1, wherein, in the functions of calculating any of the upper limit and the lower limit, for any network peers v and w in the graph, four landmarks are selected in association with the network peer v, and one landmark is selected in association with the network peer w.

5. A data processing system for a graph, in which a computer performs a path search on a weighted graph by utilizing upper limits and lower limits of the shortest path lengths d(v,w) each found between any two vertices v and w, the system comprising:
   computer-readable memory in which data can be readably recorded;
   vertex data recorded in the computer-readable memory in which data on all of vertices in the graph is readably stored;
   a reading unit to read the data on the vertices from the vertex data, and selecting a plurality of vertices as landmarks out of the vertices in the graph based upon their substantially homogeneous distribution within the graph;
   a calculating unit to calculate values of the shortest path lengths d(Lv,Lw) based on information on the selected landmarks, the shortest path lengths each found between any two vertices Lv and Lw selected as landmarks, and for recording these values in the computer-readable memory;
   a selecting unit to select one or a plurality of landmarks Lv adjacent to the vertex v in association with the shortest path lengths from any vertex v in the graph, by using the data on all of the vertices, and also by using information on the selected landmarks, for calculating values of the shortest path lengths d(v,Lv) from the vertex v to the landmarks Lv, and for recording these values in the computer-readable memory;
   a first calculating unit to, with respect to any two vertices v and w in the graph, calculate, by reading out values from the computer-readable memory, an upper limit of d(Lv, v)+d(Lv,Lw)+d(w,Lw) for one or a plurality of landmarks Lv selected in association with the vertex v, and one or a plurality of landmarks Lw selected in association with the vertex w; and
   a second calculating unit to, with respect to any two vertices v and w in the graph, calculate, by reading out values from the computer-readable memory, a lower limit of d(Lv,Lw)−d(Lv,v)−d(w,Lw) for one or a plurality of landmarks Lv selected in association with the vertex v, and one or a plurality of landmarks Lw selected in association with the vertex w.

6. The system according to claim 5, wherein, when N denotes the total number of the vertices in the graph, the landmarks are selected so that the number of the landmarks can be not less than $N^{1/2}$.

7. The system according to claim 5, wherein, in association with the shortest path lengths from any vertex v in the graph, four landmarks are selected as the landmarks adjacent to the vertex v.

8. The system according to claim 5, wherein, in the first and second calculating units, in calculating any of the upper limits and the lower limits, for any vertices v and w in the graph, four landmarks are selected in association with the vertex v, and one landmark is selected in association with the vertex w.

9. A data processing method on a graph, for causing a computer having memory to perform a path search on a weighted graph having a plurality of vertices, by utilizing the upper limits and the lower limits of the shortest path lengths d(v,w) each found between any two vertices v and w, the method comprising:

selecting a plurality of vertices as landmarks out of the vertices in the graph based upon their substantially homogeneous distribution within the graph, by processing of the computer;

calculating the shortest path lengths d(Lv,Lw) each found between any two vertices Lv and Lw selected as the landmarks, and recording these shortest path lengths in the memory, by processing of the computer;

selecting one or a plurality of landmarks Lv adjacent to the vertex v in association with the shortest path lengths from any vertex v in the graph, calculating the shortest path lengths d(v,Lv) from the vertex v to the landmarks Lv, and recording these shortest path lengths in the memory, by processing of the computer;

calculating an upper limit of d(Lv,v)+d(Lv,Lw)+d(w,Lw), by reading out values from the memory, for one or a plurality of landmarks Lv selected in association with the vertex v as well as one or a plurality of landmarks Lw selected in association with the vertex w, and providing the upper limit as an upper limit of d(v,w), for any two vertices v and w in the graph, by processing of the computer; and calculating a lower limit of d(Lv,Lw)−d(Lv,v)−d(w,Lw), by reading from the memory values of one or plurality of landmarks Lv selected in association with the vertex v as well as one or plurality of landmarks Lw selected in association with the vertex w, and providing the lower limit as a lower limit of d(v,w), for any two vertices v and w in the graph, by processing of the computer.

10. The method according to claim 9, wherein, when N denotes the total number of the vertices in the graph, the landmarks are selected so that the number of the landmarks can be not less than $N^{1/2}$.

11. The method according to claim 9, wherein, in association with the shortest path lengths from any vertex v in the graph, four landmarks are selected as the landmarks adjacent to the vertex v.

12. The method according to claim 9, wherein, in any of the steps of calculating the upper limits and the lower limits, for any vertices v and w in the graph, four landmarks are selected in association with the vertex v, and one landmark is selected in association with the vertex w.

13. The method according to claim 9, wherein the step of selecting a plurality of vertices as landmarks further comprising:

repeating the steps of taking the smallest rectangle containing all of the vertices of the graph;

quadrisecting the rectangle into four rectangles by two straight lines which are parallel to longitudinal and lateral sides of the rectangle, and which pass through the center of the rectangle; and repeating the step of further quadrisecting each of areas obtained by dividing the rectangle if the area contains not less than a prescribed number of vertices, selecting, as the landmark, the vertex nearest to the center of each area of the smallest rectangle upon completion of the repeatedly-quadrisecting step.

14. The method according to claim 9, wherein the plurality of vertices represent network peers having network paths within a computer network, such that shortest path lengths are the shortest network path lengths between the network peers.

15. A data processing system in which a computer performs a path search on a weighted graph, comprising:

graph vertex memory in which vertex data on all of vertices in the graph is readably recorded;

landmark memory in which values of the shortest path lengths d(Lv,Lw) are readably recorded, the values each found between any two vertices Lv and Lw selected as landmarks out of all of the vertices based upon their substantially homogeneous distribution within the graph;

adjacent-landmark memory in which values of the shortest path lengths d(v,Lw) are readably recorded, the values each found between any vertex v in the graph and each of one or a plurality of landmarks Lw adjacent to the vertex v;

upper-limit calculation unit for calculating an upper limit of d(Lv,v)+d(Lv,Lw)+d(w,Lw) for any two vertices v and w in the graph, and for returning a value of the upper limit, by reading values from the graph vertex memory unit and the adjacent-landmark memory unit, the values being one or a plurality of landmarks Lv selected in association with the vertex v as well as one or a plurality of landmarks Lw selected in association with the vertex w;

lower-limit calculation unit for calculating a lower limit of d(Lv,Lw)−d(Lv,v)−d(w,Lw) for any two vertices v and w in the graph, and for returning a value of the lower limit, by reading values from the graph vertex memory unit and the adjacent-landmark memory unit, the value being one or a plurality of landmarks Lv selected in association with the vertex v as well as one or a plurality of landmarks Lw selected in association with the vertex w; and path-search unit for performing A* search by use of upper limits and lower limits of the shortest path lengths d(v,w) each found between any two vertices v and w, by receiving a starting point as well as a terminal in the graph and by calling up the upper-limit calculation unit as well as the lower-limit calculation unit, and thereby for outputting a result of the search, the result containing the shortest path between the starting point and the terminal.

16. The system according to claim 15, further comprising search-direction determination unit for:

calculating a lower limit from the starting point to the terminal as well as a lower limit from the terminal to the starting point;

comparing these lower limits with each other, by receiving a starting point as well as a terminal in the graph and by calling up the lower-limit calculation unit;

replacing the starting point and the terminal with each other in response to a fact that the lower limit from the starting point to the terminal is larger than the lower limit from the terminal to the starting point; and delivering the replaced starting point and terminal to the path-search unit.

17. The system according to claim 15, wherein the plurality of vertices represent network peers having network paths within a computer network, such that shortest path lengths are the shortest network path lengths between the network peers.

18. A path-search method for allowing a computer having memory to perform a path search on a weighted graph having a plurality of landmarks selected, the memory having the shortest path length between any vertex and each of the landmarks recorded therein, the method comprising:
calculating an upper limit of $d(Lv,v)+d(Lv,Lw)+d(w,Lw)$ for any two vertices v and w in the graph that are substantially homogeneously distribution within the graph by reading from the memory values of one or a plurality of landmarks Lv selected in association with the vertex v as well as one or a plurality of landmarks Lw selected in association with the vertex w, and then returning a value of the upper limit, by processing of the computer;
calculating a lower limit of each of $d(Lv,Lw)-d(Lv,v)-d(w,Lw)$ for any two vertices v and w in the graph that are substantially homogeneously distribution within the graph by reading from the memory values of one or a plurality of landmarks Lv selected in association with the vertex v as well as one or a plurality of landmarks Lw selected in association with the vertex w, and then returning a value of the lower limit, by processing of the computer; and
performing A* search by receiving a starting point as well as a terminal in the graph, and by performing the steps of calculating the upper limit as well as the lower limit to calculate upper limits and lower limits of the shortest path lengths $d(v,w)$ each found between any two vertices v and w, and thereby outputting a result of the search, by processing of the computer, the result containing the shortest path between the starting point and the terminal.

19. The method according to claim 18, further comprising:
calculating a lower limit from the starting point to the terminal as well as a lower limit from the terminal to the starting point by executing the step of calculating the lower limit;
comparing these lower limits with each other;
replacing the starting point and the terminal with each other in response to a fact that the lower limit from the starting point to the terminal is larger than the lower limit from the terminal to the starting point; and
delivering the replaced starting point and terminal to the step of outputting a result of the search.

20. The method according to claim 18, wherein the plurality of vertices represent network peers having network paths within a computer network, such that shortest path lengths are the shortest network path lengths between the network peers.

21. The program according to claim 1, wherein the number of landmarks selected is less than the number of network peers.

* * * * *